United States Patent
Yeung et al.

(10) Patent No.: US 7,958,258 B2
(45) Date of Patent: Jun. 7, 2011

(54) MOBILE COMMUNICATION DEVICE DOMAIN NAME SYSTEM REDIRECTION

(75) Inventors: Wing-Cheong V. Yeung, San Ramon, CA (US); Tina T. Tran, Concord, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 86 days.

(21) Appl. No.: 12/555,846

(22) Filed: Sep. 9, 2009

(65) Prior Publication Data

US 2011/0060838 A1 Mar. 10, 2011

(51) Int. Cl.
*G06F 15/16* (2006.01)
*G06F 15/173* (2006.01)

(52) U.S. Cl. ........ 709/238; 709/227; 709/228; 709/239; 709/245

(58) Field of Classification Search .................. 709/227, 709/228, 238, 239, 245
See application file for complete search history.

(56) References Cited

U.S. PATENT DOCUMENTS

| 7,631,101 | B2 * | 12/2009 | Sullivan et al. | 709/245 |
| 2003/0088696 | A1 * | 5/2003 | McCanne | 709/238 |
| 2004/0215826 | A1 * | 10/2004 | Pfitzner | 709/245 |
| 2008/0262920 | A1 * | 10/2008 | O'Neill et al. | 705/14 |

* cited by examiner

*Primary Examiner* — Shawki S Ismail
*Assistant Examiner* — Edward J Kim

(57) ABSTRACT

A device provides, to a domain name system (DNS), uniform resource locator (URL) information received from a user device, and generates a redirect query when a redirect error is received from the DNS based on the URL information. The device also provides the redirect query to a policy server/accounting database, and receives, from the policy server/accounting database, information indicating that the user device subscribes to a redirect service and subscriber information associated with the user device. A device management database (DMD) query is generated based on the subscriber information, provides the DMD query to a DMD server, and receives, from the DMD server, model information associated with the user device, where the URL information and the model information are used to retrieve redirect information for the user device.

24 Claims, 17 Drawing Sheets

| SUBSCRIBER | NAT IP | SUBSCRIBER ID | REDIRECT OPT IN / OPT OUT |
|---|---|---|---|
| NAME1 | NAT IP1 | MDN | IN |
| NAME2 | NAT IP2 | MIN | IN |
| NAME3 | NAT IP3 | IMEI | OUT |
| NAME4 | NAT IP4 | MEID | IN |

810 820 830 840

850 ⎨ (rows)

| SUBSCRIBER ID | MODEL TYPE | MODEL NUMBER | MODEL NAME | SCREEN FORM FACTORS |
|---|---|---|---|---|
| MDN | TYPE1 | AAA222 | MODEL NAME1 | SCREEN SIZE |
| MEID | TYPE2 | BBB333 | MODEL NAME2 | TRANSCODING FACTORS |
| IMEI | TYPE3 | CCC444 | MODEL NAME3 | * * * |

910 920 930 940 950

960

⋮

US 7,958,258 B2

MOBILE COMMUNICATION DEVICE DOMAIN NAME SYSTEM REDIRECTION

BACKGROUND

Domain name system (DNS) redirection (also known as uniform resource locator (URL) redirection, URL forwarding, domain redirection, and/or domain forwarding) is a technique for making a web page available under many URLs. A DNS redirection service may provide an Internet link that redirects users to desired content. DNS redirection may be used for several reasons. For example, if a user mistypes a URL address (e.g., "www.exmaple.com"), DNS redirection may redirect the user's browser to a correct URL address (e.g., "www.example.com"). Organizations often register these misspelled domains and re-direct them to the correct location. In another example, DNS redirection may be used if a web site is moving to a new domain (e.g., if a web site changes its domain name, if two web sites merge, etc.). However, DNS redirection is not available for mobile communication devices (e.g., wireless telephones, cellular telephones, personal digital assistants (PDAs), etc.) connected to the Internet.

BRIEF DESCRIPTION OF THE DRAWINGS

FIG. 8 illustrates a diagram of an exemplary portion of an exemplary database capable of being provided in and/or maintained by the policy server/accounting database of FIG. 1;

FIG. 9 depicts a diagram of an exemplary portion of an exemplary database capable of being provided in and/or maintained by the DMD server of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may provide a DNS redirection service (e.g., a redirect service) for mobile communication devices (e.g., wireless telephones, cellular telephones, PDAs, etc.). In one implementation, for example, the systems and/or methods may receive URL information from a user device (e.g., a mobile communication device), may provide the URL information to a DNS for determining if there is a redirect error associated with the URL information, and may provide a redirect query to a policy server/accounting database when a redirect error is received from the DNS. The systems and/or methods may receive, from the policy server/accounting database, information indicating that the user device subscribes to a redirect service and/or subscriber information associated with the user device, and may provide, to a DMD server, a DMD query based on the subscriber information associated with the user device. The systems and/or methods may receive, from the DMD server and based on the DMD query, model information associated with the user device, and may provide the URL information and the model information to a landing page portal. The systems and/or methods may receive, from the landing page portal and based on the URL/model information, redirect information, and may provide the redirect information to the user device.

As used herein, the term "user" is intended to be broadly interpreted to include a user device or a user of a user device.

Figure 1:
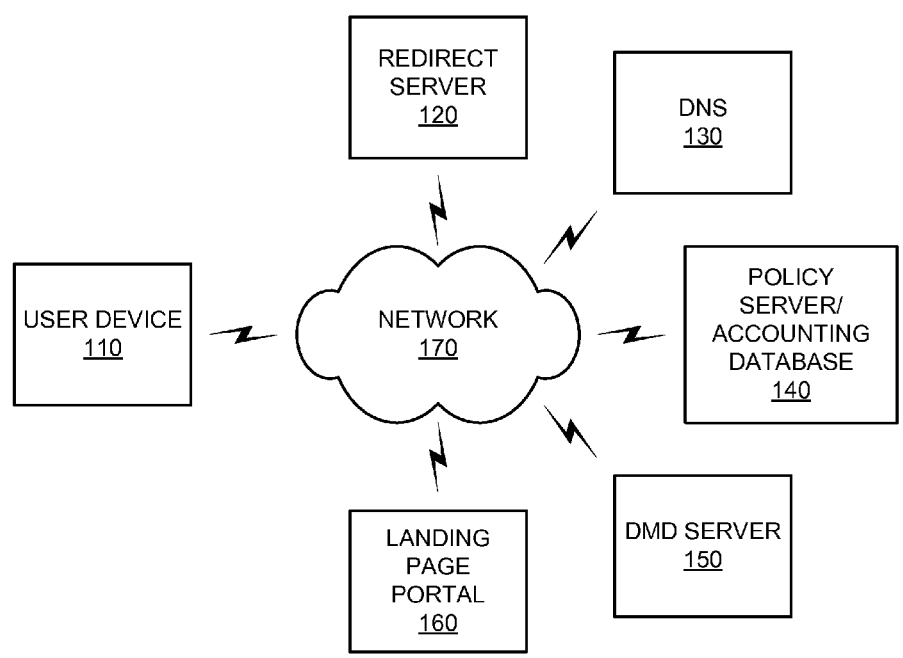
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, a redirect server 120, a DNS 130, a policy server/accounting database 140, a DMD server 150, and a landing page portal 160 interconnected by a network 170. Components of network 100 may interconnect via wired and/or wireless connections. A single user device 110, redirect server 120, DNS 130, policy server/accounting database 140, DMD server 150, landing page portal 160, and network 170 have been illustrated in FIG. 1 for simplicity. In practice, there may be more user devices 110, redirect servers 120, DNSs 130, policy server/accounting databases 140, DMD servers 150, landing page portals 160, and/or networks 170. Also, in some instances, one or more of the components of network 100 may perform one or more functions described as being performed by another one or more of the components of network 100.

User device 110 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In one implementation, user device 110 may include any device (e.g., an Internet Protocol (IP)-based device) that enables a user to access the Internet via network 170. Users of user device 110 (and/or other user devices) may or may not sign up for a redirect service (e.g., when they sign up with a service provider, such as a telecommunications provider). Information regarding whether users of user device 110 (and/or other user devices) opt in or opt out of the redirect service may be provided to and/or stored in policy server/accounting database 140 (e.g., in a database).

Redirect server 120 may include one or more server entities, or other types of computation or communication devices, that gather, process, search, and/or provide information in a manner described herein. In one implementation, redirect server 120 may receive URL information from user device 110, may provide the URL information to DNS 130 to determine if there is a redirect error associated with the URL information, and may provide a redirect query (e.g., to determine whether user device 110 subscribes to a redirect service) to policy server/accounting database 140 when a redirect error is received from DNS 130. Redirect server 120 may receive, from policy server/accounting database 140, information indicating that user device 110 subscribes to a redirect service and/or subscriber information associated with user device 110, and may provide, to DMD server 150, a DMD query (e.g., to determine model information associated with user device 110) based on the subscriber information. Redirect server 120 may receive, from DMD server 150 and based on the DMD query, model information associated with user device 110, and may provide the URL information and the model information to landing page portal 160. Redirect server 120 may receive, from landing page portal 160 and based on the URL/model information, redirect information, and may provide the redirect information to user device 110.

DNS 130 may include one or more server entities, or other types of computation or communication devices, that gather, process, search, and/or provide information in a manner described herein. In one implementation, DNS 130 may include a hierarchical naming system for computers, services, and/or any resource participating in the Internet. DNS 130 may associate various information with domain names assigned to each participant, and may translate domain names meaningful to humans into numerical (e.g., binary) identifiers associated with network devices for purposes of locating and addressing these devices world-wide. In one exemplary implementation, DNS 130 may receive URL information (e.g., a URL entered via user device 110), and may determine if the URL information is correct (e.g., matches a URL stored by DNS 130). If the URL information is incorrect, DNS 130 may provide (e.g., to redirect server 120) a redirect error indicating that a redirect service (e.g., redirecting the URL to another URL) should be utilized.

Policy server/accounting database 140 may include one or more server entities, or other types of computation or communication devices, that gather, process, search, and/or provide information in a manner described herein. In one implementation, policy server/accounting database 140 may provide authentication, authorization, and accounting services (e.g., for user device 110). With regard to authentication, policy server/accounting database 140 may verify an entity's (e.g., user device 110) claim to a specific digital identity via an identifier (e.g., an identifier for user device 110, such as a mobile directory number (MDN), a mobile identification number (MIN), a mobile equipment identity (MEID), an international mobile equipment identity (IMEI), an International Mobile Subscriber Identity (IMSI), etc.) and credentials (e.g., passwords, tokens, digital certificates, etc.). With regard to authorization, policy server/accounting database 140 may grant or refuse privileges to an entity (e.g., user device 110) for accessing specific services (e.g., a DNS redirect service). With regard to accounting, policy server/accounting database 140 may track consumption of network resources by users. In one exemplary implementation, policy server/accounting database 140 may receive, from redirect server 120, a redirect query (e.g., inquiring whether user device 110 subscribes to a redirect service), and may compare the redirect query to a database that includes information associated with user device 110 (e.g., subscriber information, whether a user device subscribes to a redirect service, etc.). Policy server/accounting database 140 may provide, to redirect server 120 and based on the database comparison, an indication of whether user device 110 subscribes to a redirect service and/or subscriber information associated with user device 110. In one exemplary implementation, some or all of the functions performed by policy server/accounting database 140 may be performed by one or more other network devices, such as an authentication/authorizing/accounting (AAA) server, a policy charging rule function (PCRF), and/or a home subscriber server (HSS).

DMD server 150 may include one or more server entities, or other types of computation or communication devices, that gather, process, search, and/or provide information in a manner described herein. In one implementation, DMD server 150 may include a database that stores model information (e.g., model type information, model number information, model name information, screen form factors, etc.) associated with user device 110 and/or other user devices. DMD server 150 may receive, from redirect server 120, a DMD query (e.g., to determine model information associated with user device 110) based on the subscriber information (e.g., obtained from policy server/accounting database 140), and may compare the DMD query to the database of model information. DMD server 150 may provide, to redirect server 120 and based on the comparison, model information associated with user device 110.

Landing page portal 160 may include one or more server entities, or other types of computation or communication devices, that gather, process, search, and/or provide information in a manner described herein. In one implementation, landing page portal 160 may receive, from redirect server 120, the URL information (e.g., provided by user device 110) and the model information (e.g., provided by DMD server 150). Landing page portal 160 may provide, to redirect server 120 and based on the URL/model information, redirect information (e.g., information redirecting user device 110 to another URL other than the URL entered by user device 110). In one example, landing page portal 160 may provide redirect server 120 with a set of links associated with the URL entered by user device 110 and/or one or more advertisements. A "link," as the term is used herein, is to be broadly interpreted to include any reference to/from a document from/to another document or another part of the same document. A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a blog post, a web advertisement, etc. In the context of the Internet, a common document is a web page. Documents often include textual information and may include embedded information (such as meta information, images, hyperlinks, etc.) and/or embedded instructions (such as Javascript, etc.).

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows exemplary components of network 100, in other implementations, network 100 may contain fewer, different, differently arranged, or additional components than depicted in FIG. 1. For example, redirect server 120 may be co-located with one or more distribution center sites that provide telecommunications services to user devices.

Figure 2:
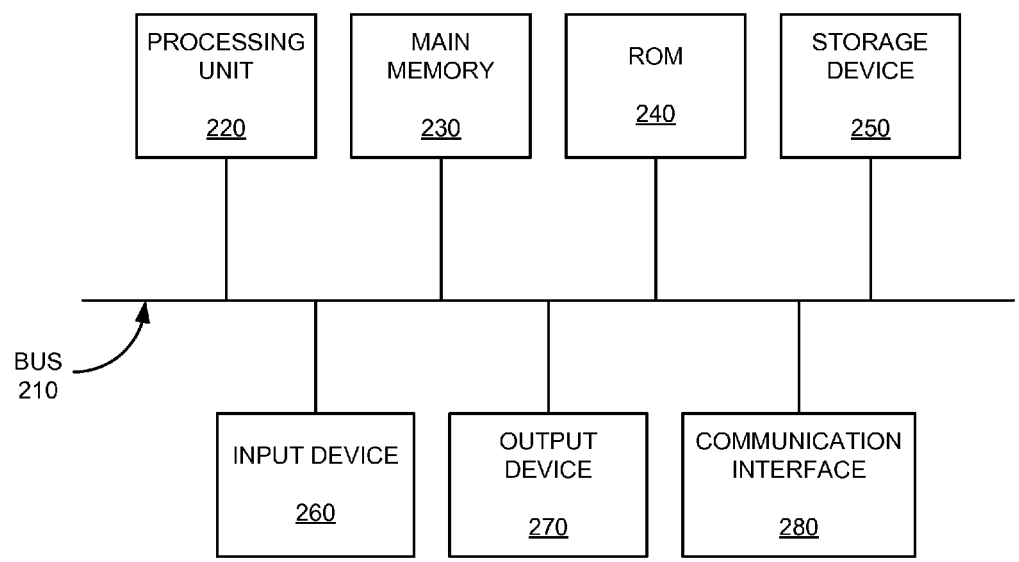
FIG. 2 illustrates a diagram of exemplary components of a redirect server, a domain name system (DNS), a policy server and/or accounting database, a device management database (DMD) server, and/or a landing page portal of the network depicted in FIG. 1.

FIG. 2 is an exemplary diagram of a device 200 that may correspond to, for example, any of redirect server 120, DNS 130, policy server/accounting database 140, DMD server 150, and/or landing page portal 160. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
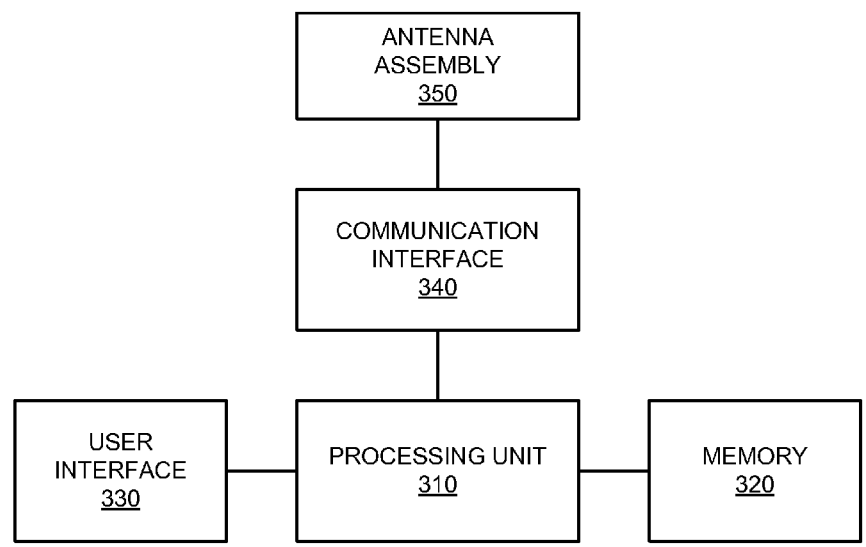
FIG. 3 depicts a diagram of exemplary components of a user device of the network illustrated in FIG. 1.

FIG. 3 depicts a diagram of exemplary components of a device 300 that may correspond to, for example, user device 110. As illustrated, device 300 may include a processing unit 310, memory 320, a user interface 330, a communication interface 340, and/or an antenna assembly 350.

Processing unit 310 may include one or more processors, microprocessors, application specific integrated circuits (ASICs), field programmable gate arrays (FPGAs), or the like. Processing unit 310 may control operation of device 300 and its components. In one implementation, processing unit 310 may control operation of components of device 300 in a manner described herein.

Memory 320 may include a random access memory (RAM), a read-only memory (ROM), and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to cause device 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 3430 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network (e.g., network 170).

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4A:
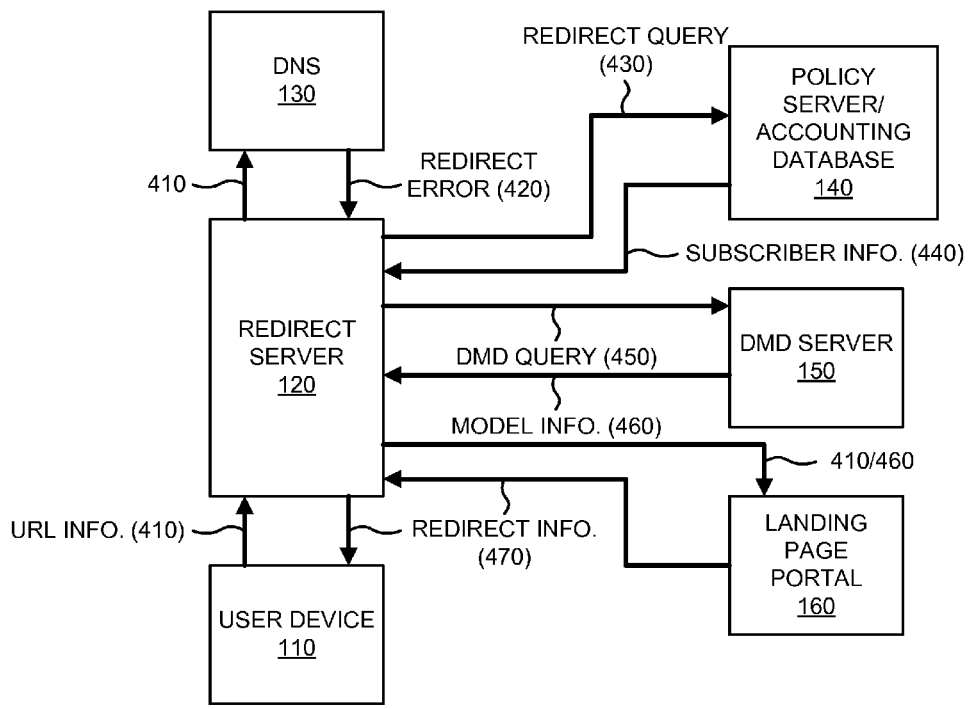
FIGS. 4A-4C illustrates a diagram of exemplary interactions among components of an exemplary portion of the network depicted in FIG. 1.
Figure 4B:
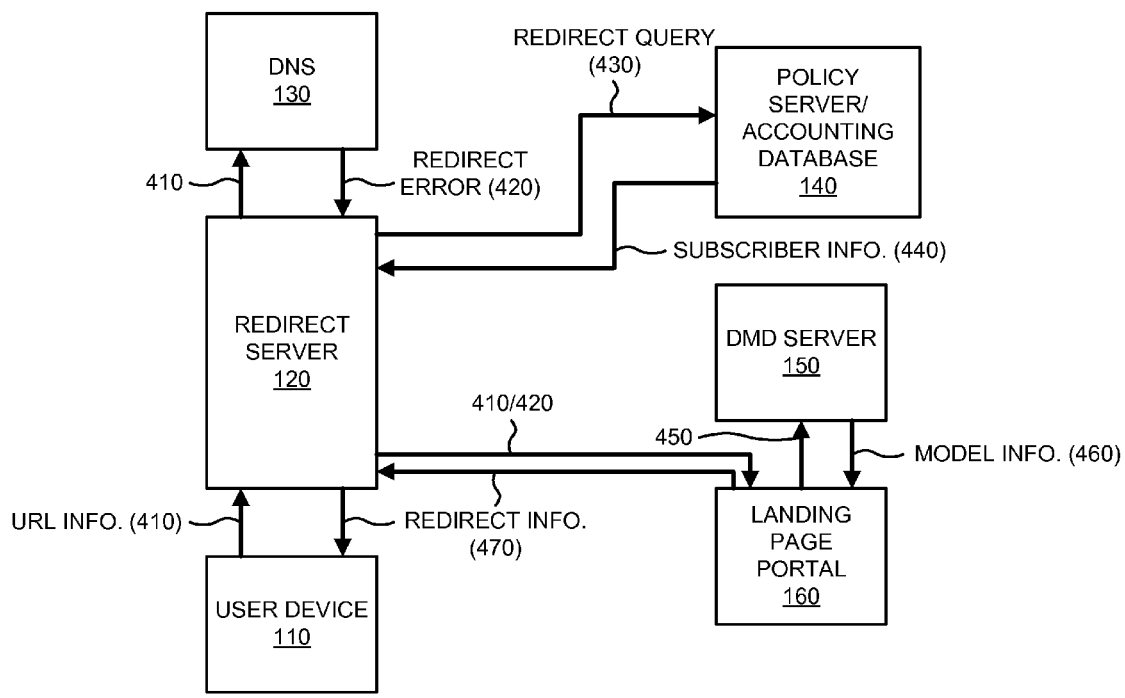
Figure 4C:
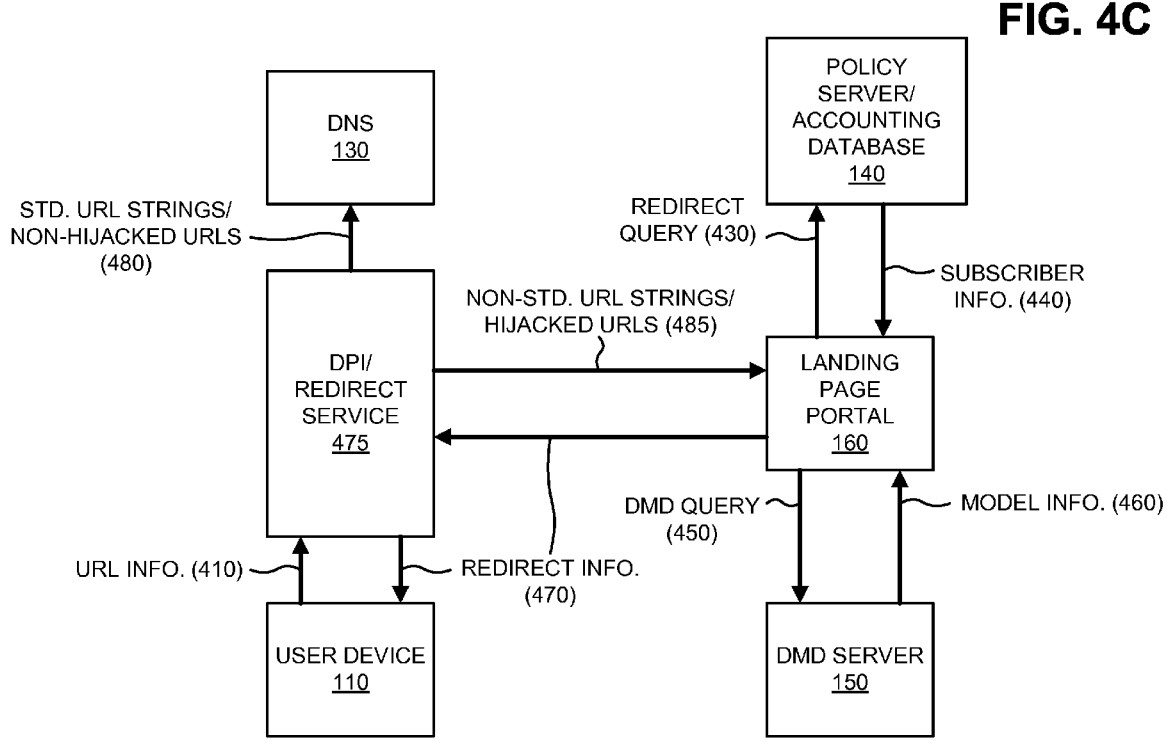

FIGS. 4A-4C illustrates a diagram of exemplary interactions among components of an exemplary portion 400 of network 100. As shown in FIG. 4A, exemplary network portion 400 may include user device 110, redirect server 120, DNS 130, policy server/accounting database 140, DMD server 150, and landing page portal 160. User device 110, redirect server 120, DNS 130, policy server/accounting database 140, DMD server 150, and landing page portal 160 may include the features described above in connection with, for example, FIG. 1.

As further shown in FIG. 4A, user device 110 may provide URL information 410 to redirect server 120. URL information 410 may include one or more URLs entered by a user of user device 110. In one example, URL information 410 may include a mistyped (or incorrectly entered) URL. Redirect server 120 may receive URL information 410 from user device 110, and may provide URL information 410 to DNS 130. DNS 130 may receive URL information 410, and may determine if URL information 410 is correct (e.g., matches a URL stored by DNS 130). If URL information 410 is incorrect, DNS 130 may provide (e.g., to redirect server 120) a redirect error 420 indicating that a redirect service (e.g., redirecting URL information 410 to another URL) should be utilized.

If redirect server 120 receives redirect error 420 from DNS 130, redirect server 120 may determine, via policy server/accounting database 140, whether user device 110 subscribes to (e.g., opts in or opts out of) the redirect service. Redirect server 120 may provide a redirect query 430 to policy server/accounting database 140 when redirect error 420 is received from DNS 130. Redirect query 430 may include information used to determine whether user device 110 subscribes to the redirect service. In one example, redirect query 430 may include a public IP query, a private to public IP mapping query, etc. Policy server/accounting database 140 may receive redirect query 430, and may compare redirect query 430 to a database that includes information associated with user device 110 (e.g., subscriber information, whether a user device subscribes to a redirect service, etc.). Policy server/accounting database 140 may provide, to redirect server 120 and based on the database comparison, subscriber information 440 associated with user device 110. Subscriber information 440 may include an indication of whether user device 110 subscribes to a redirect service, subscriber identification information (e.g., a MDN, a MIN, a MEID, an IMEI, an IMSI, a subscriber network address translation (NAT) IP for the MDN, MIN, and/or MEID, etc.) associated with user device 110, etc.

Redirect server 120 may receive subscriber information 440 from policy server/accounting database 140, and may provide a DMD query 450 to DMD server 150. DMD query 450 may include information (e.g., subscriber information 440) used to determine model information associated with user device 110. DMD server 150 may receive DMD query 450, and may compare DMD query 450 to a database that stores model information (e.g., model type information, model number information, model name information, screen form factors, etc.) associated with user device 110 and/or other user devices. DMD server 150 may provide, based on the comparison, model information 460 to redirect server 120. Model information 460 may include model type information, model number information, model name information, screen form factors, etc. associated with user device 110.

Redirect server 120 may receive model information 460, and may provide URL information 410 and model information 460 to landing page portal 160. Landing page portal 160 may receive URL information 410/model information 460, and may provide, to redirect server 120 and based on URL information 410/model information 460, redirect information 470. Redirect information 470 may include information redirecting user device 110 to another URL other than the URL entered via URL information 410. In one example, landing page portal 160 may provide redirect server 120 with a set of links associated with the URL entered by user device 110 and/or one or more advertisements. In another example, landing page portal 160 may provide redirect server 120 with a redirect document (e.g., a web page). Redirect server 120 may receive redirect information 470 from landing page portal 160, and may provide redirect information 470 to user device 110. In one example, a user of user device 110 may select one of the set of links and may receive a document (e.g., a web page) associated with the selected link. In another example, the user of user device 110 may be presented with the redirect document.

FIG. 4B provides alternative interactions between the components of network portion 400, according to implementations described herein. The interactions depicted in FIG. 4B may be the same as the interactions depicted in FIG. 4A except that if subscriber information 440 indicates that user device 110 subscribes to a redirect service, redirect server 120 may provide URL information 410 and redirect error 420 to landing page portal 160. Landing page portal 160 may receive URL information 410/redirect error 420, and may provide (e.g., rather than redirect server 120 providing) DMD query 450 to DMD server 150. Landing page portal 160 may receive model information 460 from DMD server 150 based on DMD query 450, and may provide redirect information 470 (e.g., based on URL information 410/model information 460) to redirect server 120. Redirect server 120 may receive redirect information 470 from landing page portal 160, and may provide redirect information 470 to user device 110.

FIG. 4C provides alternative interactions between the components of network portion 400, according to implementations described herein. As shown in FIG. 4C, redirect server 120 may be replaced with a deep packet inspection (DPI)/redirect service device 475. DPI/redirect service device 475 may include some or all of the features described above in connection with, for example, redirect server 120. DPI/redirect service device 475 may receive URL information 410 from user device 110, and may inspect URL information 410 (e.g., user datagram protocol (UDP) packets of URL information 410) for non-standard URL strings (e.g., "www.uspto.vog") and/or hijacked URLs (e.g., a domain name with a misspelled version of a popular URL). If URL information 410 includes standard URL strings and/or non-hijacked URLs 480, DPI/redirect service device 475 may forward standard URL strings/non-hijacked URLs 480 to DNS 130. However, if URL information 410 includes non-standard URL strings and/or hijacked URLs 485, DPI/redirect service device 475 may forward non-standard URL strings/hijacked URLs 485 to landing page portal 160 for further processing.

As further shown in FIG. 4C, if landing page portal 160 receives non-standard URL strings/hijacked URLs 485 from DPI/redirect service device 475, landing page portal 160 may determine, via policy server/accounting database 140, whether user device 110 subscribes to (e.g., opts in or opts out of) the redirect service. Landing page portal 160 may provide redirect query 430 to policy server/accounting database 140 when non-standard URL strings/hijacked URLs 485 are received from DPI/redirect service device 475. Policy server/accounting database 140 may receive redirect query 430, and may compare redirect query 430 to a database that includes information associated with user device 110 (e.g., subscriber information, whether a user device subscribes to a redirect service, etc.). Policy server/accounting database 140 may provide, to landing page portal 160 and based on the database comparison, subscriber information 440 associated with user device 110.

Landing page portal 160 may receive subscriber information 440 from policy server/accounting database 140, and may provide DMD query 450 to DMD server 150. DMD server 150 may receive DMD query 450, and may compare DMD query 450 to a database that stores model information (e.g., model type information, model number information, model name information, screen form factors, etc.) associated with user device 110 and/or other user devices. DMD server 150 may provide, based on the comparison, model information 460 to landing page portal 160. Landing page portal 160 may receive model information 460, and may provide, to DPI/redirect service device 475, redirect information 470 based on non-standard URL strings/hijacked URLs 485 and/ or model information 460. DPI/redirect service device 475 may receive redirect information 470 from landing page portal 160, and may provide redirect information 470 to user device 110.

Although FIGS. 4A-4C show exemplary components of network portion 400, in other implementations, network portion 400 may contain fewer, different, differently arranged, or additional components than depicted in FIGS. 4A-4C. In still other implementations, one or more components of network portion 400 may perform one or more other tasks described as being performed by one or more other components of network portion 400.

Figure 5:
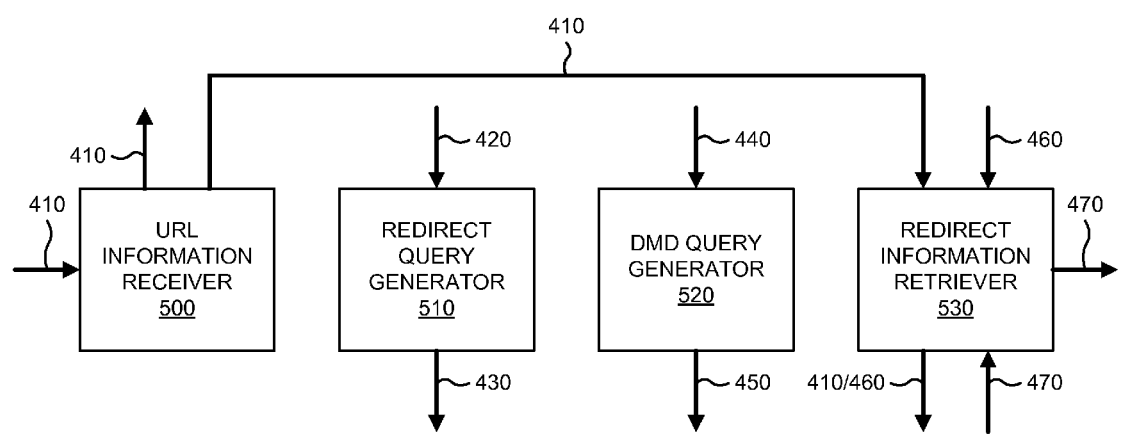
FIG. 5 depicts a diagram of exemplary functional components of the redirect server of FIG. 1.

FIG. 5 depicts a diagram of exemplary functional components of redirect server 120. In one implementation, the functions described in connection with FIG. 5 may be performed by one or more of the components of device 200 (FIG. 2). As shown, redirect server 120 may include a URL information receiver 500, a redirect query generator 510, a DMD query generator 520, and a redirect information receiver 530.

URL information receiver 500 may include hardware or a combination of hardware and software that may receive URL information 410 from user device 110, and may provide URL information 410 to DNS 130 for determining whether URL information 410 is correct (e.g., matches a URL stored by DNS 130). URL information receiver 500 may also provide URL information 410 to redirect information retriever 530.

Redirect query generator 510 may include hardware or a combination of hardware and software that may receive redirect error 420 from DNS 130, and may determine (e.g., via policy server/accounting database 140) whether user device 110 subscribes to (e.g., opts in or opts out of) the redirect service. Redirect query generator 510 may generate redirect query 430 (e.g., which may include information used to determine whether user device 110 subscribes to the redirect service), and may provide redirect query 430 to policy server/accounting database 140 when redirect error 420 is received from DNS 130.

DMD query generator 520 may include hardware or a combination of hardware and software that may receive subscriber information 440 from policy server/accounting database 140, and may determine whether user device 110 subscribes to the redirect service based on subscriber information 440. If subscriber information 440 indicates that user device 110 subscribes to the redirect service, DMD query generator 520 may generate DMD query 450 (e.g., which may include information used to determine model information associated with user device 110). DMD query generator 520 may provide DMD query 450 to DMD server 150.

Redirect information retriever 530 may include hardware or a combination of hardware and software that may receive URL information 410 from URL information receiver 500, and may receive model information 460 from DMD server 150. Redirect information retriever 530 may provide URL information 410 and model information 460 to landing page portal 160, and may receive redirect information 470 based on URL information 410 and model information 460. Redirect information retriever 530 may provide redirect information 470 (e.g., a set of links associated with the URL entered by user device 110 and/or one or more advertisements) to user device 110. A user of user device 110 may select one of the set of links and may receive a document (e.g., a web page) associated with the selected link.

Although FIG. 5 shows exemplary functional components of redirect server 120, in other implementations, redirect server 120 may contain fewer, different, differently arranged, or additional functional components than depicted in FIG. 5. In still other implementations, one or more functional components of redirect server 120 may perform one or more other tasks described as being performed by one or more other functional components of redirect server 120.

Figure 6:
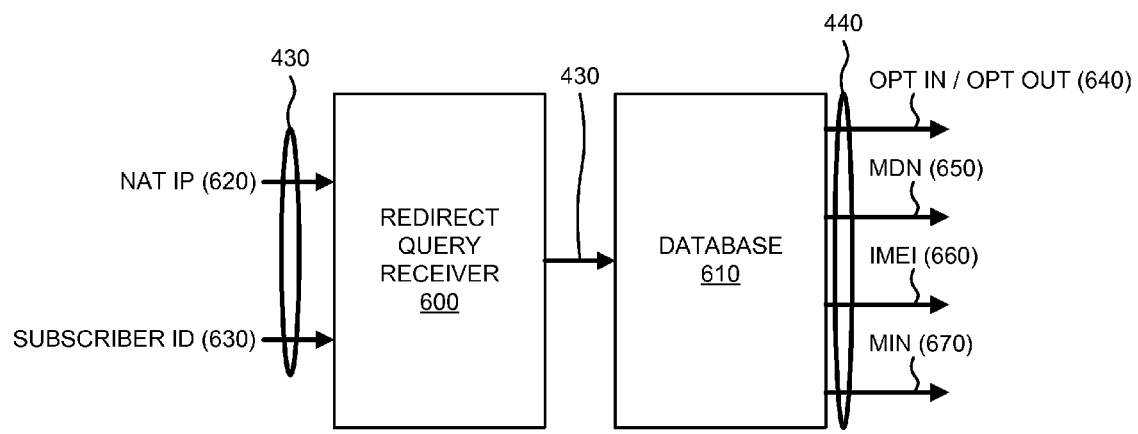
FIG. 6 illustrates a diagram of exemplary functional components of the policy server/accounting database of FIG. 1.

FIG. 6 illustrates a diagram of exemplary functional components of policy server/accounting database 140. In one implementation, the functions described in connection with FIG. 6 may be performed by one or more of the components of device 200 (FIG. 2). As shown, policy server/accounting database 140 may include a redirect query receiver 600 and a database 610.

Redirect query receiver 600 may include hardware or a combination of hardware and software that may receive redirect query 430 from redirect server 120. As shown in FIG. 6, redirect query 430 may include NAT IP information 620 and/or subscriber identification (ID) information 630. NAT IP information 620 may include NAT IP information for subscriber ID information 630, and may modify network address information (e.g., provided in subscriber ID information 630) for the purpose of remapping a given address space into another. This may enable subscriber ID information 630 to be hidden behind a public IP address. Subscriber ID information 630 may include identification information associated with user device 110, such as a MDN, a MIN, a MEID, an IMEI, etc. associated with user device 110. As further shown in FIG. 6, redirect query receiver 600 may provide redirect query 430 to database 610.

Database 610 may include one or more storage devices that may store information received by and/or provided to policy server/accounting database 140. In one implementation, database 610 may store information associated with user device 110, such as whether a user device subscribes to a redirect service (e.g., opt in/opt out information), subscriber ID information (e.g., subscriber names, MDN information, IMEI information, MIN information, NAT IP information, etc. associated with user devices), etc. Database 610 may receive redirect query 430, and may compare redirect query 430 to information contained in database 610. Database 610 may provide, to redirect server 120 and based on the comparison, subscriber information 440 associated with user device 110. As shown in FIG. 6, subscriber information 440 may include an opt in/opt out indication 640 (e.g., whether user device 110 subscribes to a redirect service), subscriber ID information (e.g., a MDN 650, a IMEI 660, a MIN 670, etc.) associated with user device 110, etc.

Although FIG. 6 shows exemplary functional components of policy server/accounting database 140, in other implementations, policy server/accounting database 140 may contain fewer, different, differently arranged, or additional functional components than depicted in FIG. 6. In still other implementations, one or more functional components of policy server/accounting database 140 may perform one or more other tasks described as being performed by one or more other functional components of policy server/accounting database 140.

Figure 7:
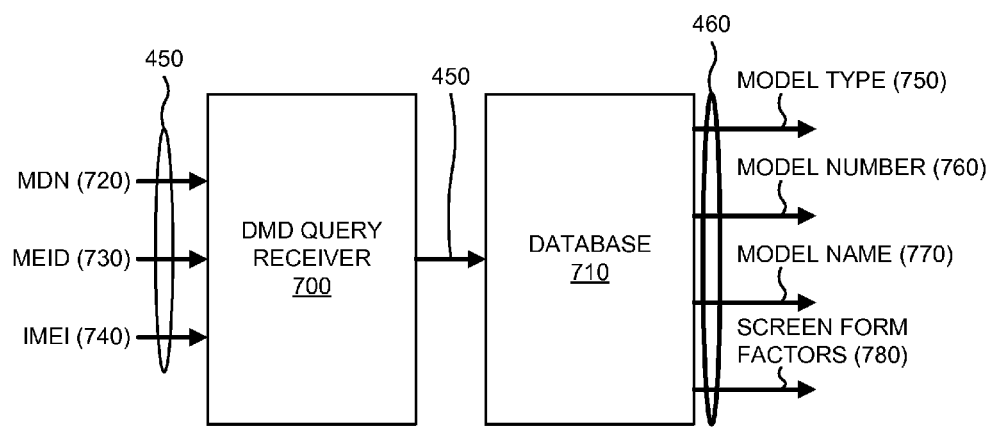
FIG. 7 depicts a diagram of exemplary functional components of the DMD server of FIG. 1.

FIG. 7 depicts a diagram of exemplary functional components of DMD server 150. In one implementation, the functions described in connection with FIG. 7 may be performed by one or more of the components of device 200 (FIG. 2). As shown, DMD server 150 may include a DMD query receiver 700 and a database 710.

DMD query receiver 700 may include hardware or a combination of hardware and software that may receive DMD query 450 from redirect server 120. As shown in FIG. 7, DMD query 450 may include identification information associated with user device 110, such as a MDN 720 (e.g., same as MDN 650), a MEID 730, an IMEI 740 (e.g., same as IMEI 660), etc.

associated with user device 110. As further shown in FIG. 7, DMD query receiver 700 may provide DMD query 450 to database 710.

Database 710 may include one or more storage devices that may store information received by and/or provided to DMD server 150. In one implementation, database 710 may store model information associated with user devices, such as model type information (e.g., conventional cell phones, PDAs, smart phones, etc.), model number information (e.g., VX10000, AX355, UX8600, etc.), model name information (e.g., Blackberry Storm®, LG enV3, etc.), screen form factors (e.g., screen size, transcoding factors, etc. for displays), etc. Database 710 may receive DMD query 450, and may compare DMD query 450 to information contained in database 710. Database 710 may provide, to redirect server 120 and based on the comparison, model information 460 associated with user device 110. As shown in FIG. 7, model information 460 may include model type information 750, model number information 760, model name information 770, and screen form factors 780 associated with user device 110.

Although FIG. 7 shows exemplary functional components of DMD server 150, in other implementations, DMD server 150 may contain fewer, different, differently arranged, or additional functional components than depicted in FIG. 7. In still other implementations, one or more functional components of DMD server 150 may perform one or more other tasks described as being performed by one or more other functional components of DMD server 150.

FIG. 8 illustrates a diagram of an exemplary portion 800 of an exemplary database capable of being provided in and/or maintained by policy server/accounting database 140. As shown, database portion 800 may include a variety of information associated with subscribers of user devices (e.g., user device 110). For example, database portion 800 may include a subscriber field 810, a NAT IP field 820, a subscriber ID field 830, a redirect opt in/opt out field 840, and/or a variety of entries 850 associated with fields 810-840.

Subscriber field 810 may include information associated with users (e.g., of user devices), such as user identification, user name, user address, user demographics, etc. For example, subscriber field 810 may include entries for "NAME1," "NAME2," "NAME3," "NAME4," etc. In one example, each entry in subscriber field 810 may include an identifier for a user (e.g., an account number, a password, etc.), the user's name, user contact information (e.g., address, telephone number, email address, etc.), etc.

NAT IP field 820 may include NAT IP information for subscriber IDs provided in subscriber ID field 830. The NAT IP information provided in NAT IP field 820 may be used to modify network address information (e.g., provided in subscriber ID field 830) for the purpose of remapping a given address space into another. This may enable the subscriber IDs provided in subscriber ID field 830 to be hidden behind a public IP address, which may protect the subscriber IDs within network 170.

Subscriber ID field 830 may include identification information associated with user devices (e.g., user device 110) of users (e.g., identified in subscriber field 810). For example, as shown in FIG. 8, subscriber ID field 830 may include MDNs, MINs, MEIDs, IMEIs, IMSIs, etc. associated with user devices of users (e.g., identified in subscriber field 810).

Redirect opt in/opt out field 840 may include information indicating whether users (e.g., identified in subscriber field 810) are subscribers to a redirect service (e.g., provided by redirect server 120). For example, as shown in FIG. 8, redirect opt in/opt out field 840 may indicate that "NAME1," "NAME2, and "NAME4" (e.g., identified in subscriber field 810) are subscribers to the redirect service (e.g., by indicating that such users opt "IN" to the redirect service). Redirect opt in/opt out field 840 may indicate that "NAME3" (e.g., identified in subscriber field 810) is not a subscriber to the redirect service (e.g., by indicating that this user opts "OUT" of the redirect service).

Although FIG. 8 shows exemplary information that may be provided in database portion 800, in other implementations, database portion 800 may contain fewer, different, differently arranged, or additional information than depicted in FIG. 8.

FIG. 9 depicts a diagram of an exemplary portion 900 of an exemplary database capable of being provided in and/or maintained by DMD server 150. As shown, database portion 900 may include a variety of information associated with user devices (e.g., user device 110). For example, database portion 900 may include a subscriber ID field 910, a model type field 920, a model number field 930, a model name field 940, a screen form factors field 950 and/or a variety of entries 960 associated with fields 910-950.

Subscriber ID field 910 may include identification information associated with user devices (e.g., user device 110). For example, as shown in FIG. 9, subscriber ID field 910 may include MDNs, MEIDs, IMEIs, IMSIs, etc. associated with user devices (e.g., user device 110).

Model type field 920 may include model type information associated with user devices (e.g., identified in subscriber ID field 910). The model type information may include information indicating whether a user device is a conventional cell phone, a PDA, a smart phone, etc. For example, as shown in FIG. 9, model type field 920 may indicate that MDN (e.g., identified in subscriber ID field 910) is a "TYPE1" user device, that MEID (e.g., identified in subscriber ID field 910) is a "TYPE2" user device, and that IMEI (e.g., identified in subscriber ID field 910) is a "TYPE3" user device.

Model number field 930 may include model number information associated with user devices (e.g., identified in subscriber ID field 910). The model number information may include information indicating a particular model number (e.g., VX10000, AX355, UX8600, etc.) of a user device. For example, as shown in FIG. 9, model number field 930 may indicate that MDN (e.g., identified in subscriber ID field 910) has a "AAA222" model number, that MEID (e.g., identified in subscriber ID field 910) has a "BBB333" model number, and that IMEI (e.g., identified in subscriber ID field 910) has a "CCC444" model number.

Model name field 940 may include model name information associated with user devices (e.g., identified in subscriber ID field 910). The model name information may include information indicating a particular model name (e.g., Blackberry Storm®, LG enV3, etc.) of a user device. For example, as shown in FIG. 9, model name field 940 may indicate that MDN (e.g., identified in subscriber ID field 910) is a "MODEL NAME1," that MEID (e.g., identified in subscriber ID field 910) is a "MODEL NAME2," and that IMEI (e.g., identified in subscriber ID field 910) is a "MODEL NAME3."

Screen form factors field 950 may include screen form factors information associated with displays of user devices (e.g., identified in subscriber ID field 910). The screen form factors information may include information indicating a particular screen size of a user device, transcoding factors for sizing information to fit a particular screen size, etc. For example, as shown in FIG. 9, screen form factors field 950 may indicate that the MDN (e.g., identified in subscriber ID field 910) is a particular screen size, and that the MEID (e.g., identified in subscriber ID field 910) uses particular transcoding factors.

Although FIG. 9 shows exemplary information that may be provided in database portion 900, in other implementations, database portion 900 may contain fewer, different, differently arranged, or additional information than depicted in FIG. 9.

FIGS. 10A-14 illustrate flow charts of an exemplary process 1000 for providing DNS redirection (e.g., a redirect service) to a mobile communication device (e.g., user device 110) according to implementations described herein. In one implementation, process 1000 may be performed by redirect server 120. In another implementation, some or all of process 1000 may be performed by another device or group of devices, including or excluding redirect server 120.

Figure 10A:
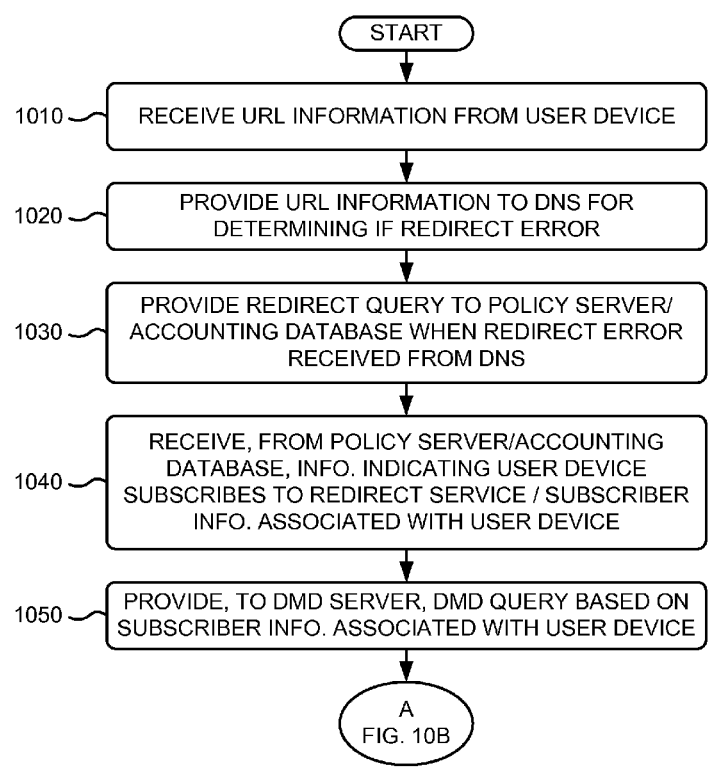
FIGS. 10A-14 illustrate flow charts of an exemplary process for providing DNS redirection to a mobile communication device according to implementations described herein.

As shown in FIG. 10A, process 1000 may include receiving URL information from a user device (block 1010), providing the URL information to a DNS for determining there is a redirect error (block 1020), and providing a redirect query to a policy server/accounting database when a redirect error is received from the DNS (block 1030). For example, in implementations described above in connection with FIG. 4A, redirect server 120 may receive URL information 410 from user device 110, and may provide URL information 410 to DNS 130. DNS 130 may receive URL information 410, and may determine if URL information 410 is correct (e.g., matches a URL stored by DNS 130). If URL information 410 is incorrect, DNS 130 may provide (e.g., to redirect server 120) redirect error 420 indicating that a redirect service (e.g., redirecting URL information 410 to another URL) should be utilized. If redirect server 120 receives redirect error 420 from DNS 130, redirect server 120 may determine, via policy server/accounting database 140, whether user device 110 subscribes to (e.g., opts in or opts out of) the redirect service. Redirect server 120 may provide a redirect query 430 to policy server/accounting database 140 when redirect error 420 is received from DNS 130.

As further shown in FIG. 10A, information indicating that the user device subscribes to a redirect service and/or subscriber information associated with the user device may be received from the policy server/accounting database (block 1040), and a DMD query based on the subscriber information associated with the user device may be provided to a DMD server (block 1050). For example, in implementations described above in connection with FIG. 4A, policy server/accounting database 140 may provide, to redirect server 120, subscriber information 440 associated with user device 110. Subscriber information 440 may include an indication of whether user device 110 subscribes to a redirect service, subscriber identification information (e.g., a MDN, a MIN, a MEID, an IMEI, an IMSI, a subscriber NAT IP for the MDN, MIN, and/or MEID, etc.) associated with user device 110, etc. Redirect server 120 may receive subscriber information 440 from policy server/accounting database 140, and may provide DMD query 450 to DMD server 150. DMD query 450 may include information (e.g., subscriber information 440) used to determine model information associated with user device 110.

Figure 10B:
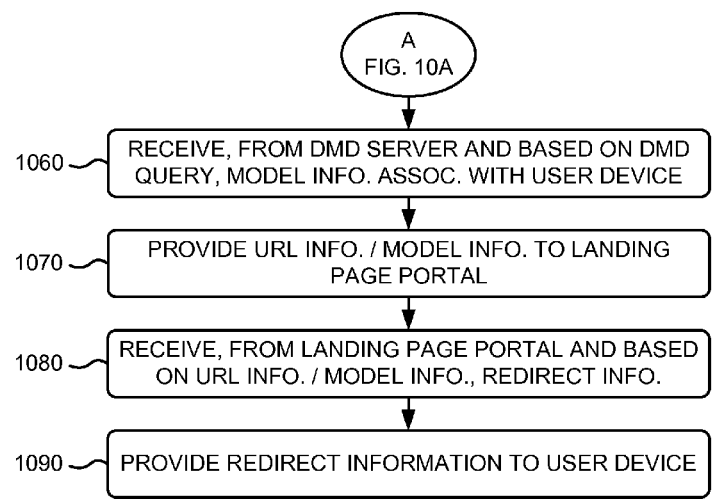

As shown in FIG. 10B, model information associated with the user device may be received from the DMD server based on the DMD query (block 1060), and the URL information and the model information may be provided to a landing page portal (block 1070). For example, in implementations described above in connection with FIG. 4A, DMD server 150 may receive DMD query 450, and may compare DMD query 450 to a database that stores model information (e.g., model type information, model number information, model name information, screen form factors, etc.) associated with user device 110 and/or other user devices. DMD server 150 may provide, based on the comparison, model information 460 to redirect server 120. Model information 460 may include model type information, model number information, model name information, screen form factors, etc. associated with user device 110. Redirect server 120 may receive model information 460, and may provide URL information 410 and model information 460 to landing page portal 160.

As further shown in FIG. 10B, redirect information may be received from the landing page portal based on the URL information and the model information (block 1080), and the redirect information may be provided to the user device (block 1090). For example, in implementations described above in connection with FIG. 4A, landing page portal 160 may receive URL information 410/model information 460, and may provide, to redirect server 120 and based on URL information 410/model information 460, redirect information 470. Redirect information 470 may include information redirecting user device 110 to another URL other than the URL entered via URL information 410. In one example, landing page portal 160 may provide redirect server 120 with a set of links associated with the URL entered by user device 110 and/or one or more advertisements. Redirect server 120 may receive redirect information 470 from landing page portal 160, and may provide redirect information 470 to user device 110. A user of user device 110 may select one of the set of links and may receive a document (e.g., a web page) associated with the selected link.

Figure 11:
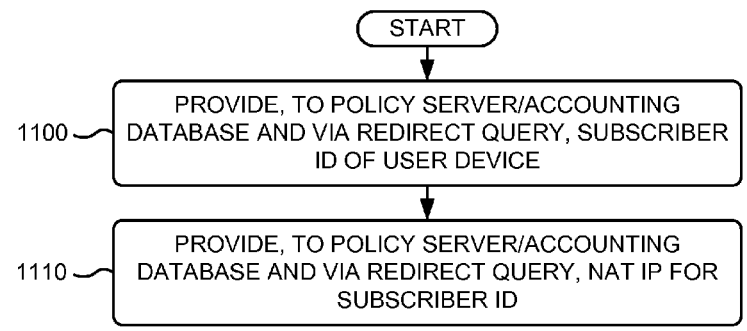

Process block 1030 may include the process blocks depicted in FIG. 11. As shown in FIG. 11, process block 1030 may include providing a subscriber ID of the user device to the policy server/accounting database and via the redirect query (block 1100), and providing a NAT IP for the subscriber ID to the policy server/accounting database and via the redirect query (block 1110). For example, in implementations described above in connection with FIG. 6, redirect query receiver 600 of policy server/accounting database 140 may receive redirect query 430 from redirect server 120. Redirect query 430 may include NAT IP information 620 and/or subscriber ID information 630. NAT IP information 620 may include NAT IP information for subscriber ID information 630, and may modify network address information (e.g., provided in subscriber ID information) for the purpose of remapping a given address space into another. This may enable subscriber ID information 630 to be hidden behind a public IP address. Subscriber ID information 630 may include identification information associated with user device 110, such as a MDN, a MIN, a MEID, an IMEI, an IMSI, etc. associated with user device 110.

Figure 12:
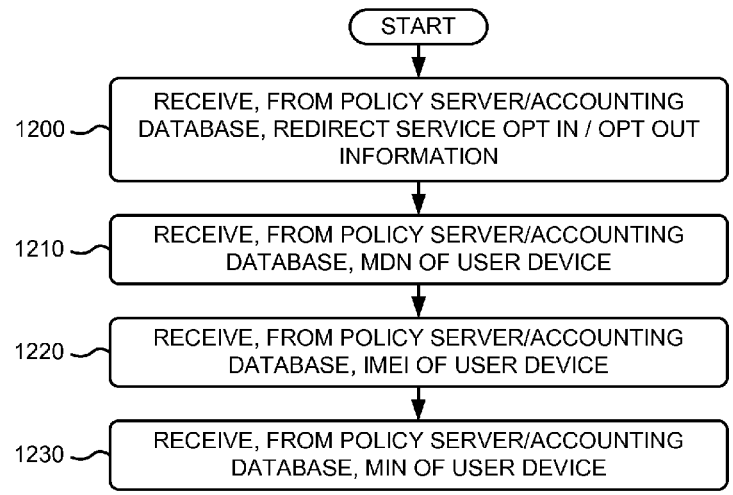

Process block 1040 may include the process blocks depicted in FIG. 12. As shown in FIG. 12, process block 1040 may include one or more of receiving redirect service opt in/opt out information from the policy server/accounting database (block 1200), receiving a MDN of the user device from the policy server/accounting database (block 1210), receiving an IMEI of the user device from the policy server/accounting database (block 1220), or receiving a MIN of the user device from the policy server/accounting database (block 1230). For example, in implementations described above in connection with FIG. 6, database 610 of policy server/accounting database 140 may receive redirect query 430, and may compare redirect query 430 to information contained in database 610. Database 610 may provide, to redirect server 120 and based on the comparison, subscriber information 440 associated with user device 110. Subscriber information 440 may include an opt in/opt out indication 640 (e.g., whether user device 110 subscribes to a redirect service), subscriber ID information (e.g., a MDN 650, a IMEI 660, a MIN 670, etc.) associated with user device 110, etc.

Figure 13:
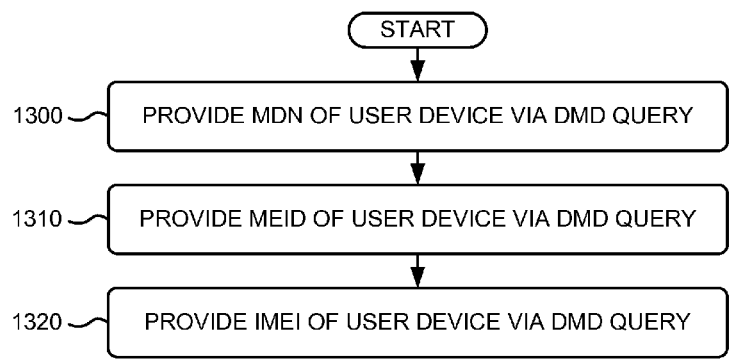

Process block 1050 may include the process blocks depicted in FIG. 13. As shown in FIG. 13, process block 1050 may include one or more of providing a MDN of the user device via the DMD query (block 1300), providing a MEID of the user device via the DMD query (block 1310), or providing an IMEI of the user device via the DMD query (block 1320). For example, in implementations described above in connection with FIG. 7, DMD query receiver 700 of DMD server 150 may receive DMD query 450 from redirect server 120. DMD query 450 may include identification information associated with user device 110, such as a MDN 720, a MEID 730, an IMEI 740, etc. associated with user device 110.

Figure 14:
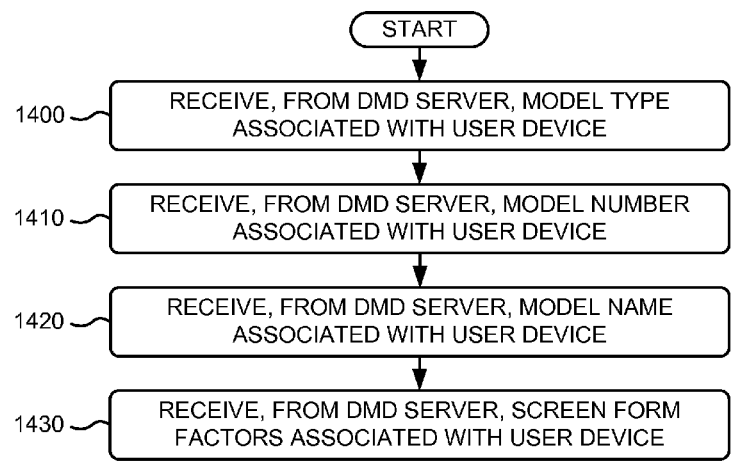

Process block 1060 may include the process blocks depicted in FIG. 14. As shown in FIG. 14, process block 1060 may include receiving, from the DMD server, a model type associated with the user device (block 1400), receiving, from the DMD server, a model number associated with the user device (block 1410), receiving, from the DMD server, a model name associated with the user device (block 1420), and receiving, from the DMD server, screen form factors associated with the user device (block 1430). For example, in implementations described above in connection with FIG. 7, database 710 of DMD server 150 may receive DMD query 450, and may compare DMD query 450 to information contained in database 710. Database 710 may provide, to redirect server 120 and based on the comparison, model information 460 associated with user device 110. Model information 460 may include model type information 750, model number information 760, model name information 770, and screen form factors 780 associated with user device 110.

Implementations described herein may provide systems and/or methods that may provide a DNS redirection service (e.g., a redirect service) for mobile communication devices. In one implementation, for example, the systems and/or methods may receive URL information from a user device (e.g., a mobile communication device), may provide the URL information to a DNS for determining if there is a redirect error associated with the URL information, and may provide a redirect query to a policy server/accounting database when a redirect error is received from the DNS. The systems and/or methods may receive, from the policy server/accounting database, information indicating that the user device subscribes to a redirect service and/or subscriber information associated with the user device, and may provide, to a DMD server, a DMD query based on the subscriber information associated with the user device. The systems and/or methods may receive, from the DMD server and based on the DMD query, model information associated with the user device, and may provide the URL information and the model information to a landing page portal. The systems and/or methods may receive, from the landing page portal and based on the URL/model information, redirect information, and may provide the redirect information to the user device.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 10A-14, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
providing, by the computing device and to a domain name system (DNS), uniform resource locator (URL) information received from a mobile user device;
generating, by the computing device, a redirect query when a redirect error is received from the DNS based on the URL information;
providing, by the computing device, the redirect query to a policy server/accounting database;
receiving, by the computing device and from the policy server/accounting database, information indicating that the mobile user device subscribes to a redirect service and subscriber information associated with the mobile user device;
generating, by the computing device, a device management database (DMD) query based on the subscriber information;
providing, by the computing device, the DMD query to a DMD server;
receiving, by the computing device and from the DMD server, model information associated with the mobile user device;
retrieving, by the computing device, redirect information, for the mobile user device, based on the URL information and the model information;
providing, by the computing device, the URL information and the model information to a landing page portal;
receiving, by the computing device and from the landing page portal, the redirect information based on the URL information and the model information; and
providing, by the computing device, the redirect information to the mobile user device.

2. The computing device-implemented method of claim 1, where the URL information comprises a URL entered by a user of the mobile user device.

3. The computing device-implemented method of claim 1, where the redirect query comprises information used by the policy server/accounting database to determine whether the mobile user device subscribes to the redirect service.

4. The computing device-implemented method of claim 3, where the redirect query comprises one or more of:
network address translation (NAT) Internet protocol (IP) information associated with the mobile user device,
a mobile directory number (MDN) associated with the mobile user device,
a mobile identification number (MIN) associated with the mobile user device, a mobile equipment identity (MEID) associated with the mobile user device,
an international mobile equipment identity (IMEI) associated with the mobile user device, or
an international mobile subscriber identity (IMSI) associated with the mobile user device.

5. The computing device-implemented method of claim 1, where the subscriber information associated with the mobile user device comprises one or more of:
a mobile directory number (MDN) associated with the mobile user device,
a mobile identification number (MIN) associated with the mobile user device,
a mobile equipment identity (MEID) associated with the mobile user device,
an international mobile equipment identity (IMEI) associated with the mobile user device, or
an international mobile subscriber identity (IMSI) associated with the mobile user device.

6. The computing device-implemented method of claim 1, where the DMD query comprises one or more of:
a mobile directory number (MDN) associated with the mobile user device,
a mobile equipment identity (MEID) associated with the mobile user device,
an international mobile equipment identity (IMEI) associated with the mobile user device, or
an international mobile subscriber identity (IMSI) associated with the mobile user device.

7. The computing device-implemented method of claim 1, where the model information associated with the mobile user device comprises one or more of:
a model type associated with the mobile user device,
a model number associated with the mobile user device,
a model name associated with the mobile user device, or
form factors associated with a display of the mobile user device.

8. The computing device-implemented method of claim 1, where the redirect information includes one or more links associated with the URL information.

9. The computing device-implemented method of claim 1, where the computing device comprises a redirect server.

10. The computing device-implemented method of claim 1, where the mobile user device comprises one or more of:
a radiotelephone,
a personal communications system (PCS) terminal,
a wireless telephone,
a cellular telephone,
a smart phone,
a personal digital assistant (PDA), or
a laptop computer with a broadband air card.

11. The computing device-implemented method of claim 1, where the policy server/accounting database includes a database with a field indicating whether the mobile user device subscribes to the redirect service.

12. The computing device-implemented method of claim 1, where the DMD server includes a database with a field providing screen form factors for a display of the mobile user device.

13. A device, comprising:
a memory to store a plurality of instructions; and
a processor to execute instructions in the memory to:
receive uniform resource locator (URL) information from a mobile user device,
provide the URL information to a domain name system (DNS),
generate a redirect query when a redirect error is received from the DNS based on the URL information,
provide the redirect query to a policy server/accounting database,
receive, from the policy server/accounting database, information indicating that the mobile user device subscribes to a redirect service and subscriber information associated with the mobile user device,
generate a device management database (DMD) query based on the subscriber information,
provide the DMD query to a DMD server,
receive, from the DMD server, model information associated with the mobile user device,
provide the URL information and the model information to a landing page portal,
receive, from the landing page portal, redirect information based on the URL information and the model information, and
provide the redirect information to the mobile user device.

14. The device of claim 13, where the device comprises a redirect server.

15. The device of claim 13, where the URL information comprises a URL incorrectly entered by a user of the mobile user device.

16. The device of claim 13, where the redirect query comprises information used by the policy server/accounting database to determine whether the mobile user device subscribes to the redirect service.

17. The device of claim 13, where the redirect query comprises one or more of:
network address translation (NAT) Internet protocol (IP) information associated with the mobile user device,
a mobile directory number (MDN) associated with the mobile user device,
a mobile identification number (MIN) associated with the mobile user device,
a mobile equipment identity (MEID) associated with the mobile user device,
an international mobile equipment identity (IMEI) associated with the mobile user device, or
an international mobile subscriber identity (IMSI) associated with the mobile user device.

18. The device of claim 13, where the subscriber information associated with the mobile user device comprises one or more of:
a mobile directory number (MDN) associated with the mobile user device,
a mobile identification number (MIN) associated with the mobile user device,
a mobile equipment identity (MEID) associated with the mobile user device,
an international mobile equipment identity (IMEI) associated with the mobile user device, or
an international mobile subscriber identity (IMSI) associated with the mobile user device.

19. The device of claim 13, where the DMD query comprises one or more of:
a mobile directory number (MDN) associated with the mobile user device,
a mobile equipment identity (MEID) associated with the mobile user device,
an international mobile equipment identity (IMEI) associated with the mobile user device, or
an international mobile subscriber identity (IMSI) associated with the mobile user device.

20. The device of claim 13, where the model information associated with the mobile user device comprises one or more of:
  a model type associated with the mobile user device,
  a model number associated with the mobile user device,
  a model name associated with the mobile user device, or
  form factors associated with a display of the mobile user device.

21. The device of claim 13, where the redirect information includes one or more links associated with the URL information.

22. The device of claim 13, where the policy server/accounting database includes a database with a field indicating whether the mobile user device subscribes to the redirect service.

23. The device of claim 13, where the DMD server includes a database with a field providing screen form factors for a display of the mobile user device.

24. A system, comprising:
  means for providing, to a domain name system (DNS), an incorrect uniform resource locator (URL) received from a mobile user device;
  means for generating a redirect query when a redirect error is received from the DNS based on the incorrect URL;
  means for providing the redirect query to a policy server/accounting database;
  means for receiving, from the policy server/accounting database, information indicating that the mobile user device subscribes to a redirect service and subscriber information associated with the mobile user device;
  means for generating a device management database (DMD) query based on the subscriber information;
  means for providing the DMD query to a DMD server;
  means for receiving, from the DMD server, model information associated with the mobile user device;
  means for providing the incorrect URL and the model information to a landing page portal;
  means for receiving, from the landing page portal, redirect information based on the incorrect URL and the model information; and
  means for providing the redirect information to the mobile user device.

* * * * *